(12) United States Patent
Huang et al.

(10) Patent No.: US 9,768,582 B2
(45) Date of Patent: Sep. 19, 2017

(54) METHOD AND APPARATUS FOR DETERMINING GAIN OF RAMAN OPTICAL AMPLIFIER AND RAMAN OPTICAL AMPLIFIER

(71) Applicant: Huawei Technologies Co., Ltd., Shenzhen (CN)

(72) Inventors: Yansui Huang, Shenzhen (CN); Enbo Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/216,415

(22) Filed: Jul. 21, 2016

(65) Prior Publication Data
US 2016/0329678 A1    Nov. 10, 2016

Related U.S. Application Data

(63) Continuation of application No. PCT/CN2014/071071, filed on Jan. 22, 2014.

(51) Int. Cl.
*H01S 3/30* (2006.01)
*H01S 3/067* (2006.01)
(Continued)

(52) U.S. Cl.
CPC .......... *H01S 3/1302* (2013.01); *H01S 3/1301* (2013.01); *H01S 3/1305* (2013.01);
(Continued)

(58) Field of Classification Search
None
See application file for complete search history.

(56) References Cited

U.S. PATENT DOCUMENTS 6,441,950 B1    8/2002   Chen et al.
7,835,067 B2 *  11/2010  Nakata ................... H04B 10/17
                                                 359/334
(Continued)

FOREIGN PATENT DOCUMENTS

CN      1412616 A      4/2003
CN    101145838 A      3/2008
(Continued)

OTHER PUBLICATIONS

Chen et al., "Control of transient effects in distributed and lumped Raman amplifiers," IEEE Electronic Letters, vol. 37, Issue 21, pp. 1304-1305, Institute of Electrical and Electronics Engineers, New York, New York (Oct. 11, 2001).

(Continued)

*Primary Examiner* — Eric Bolda
(74) *Attorney, Agent, or Firm* — Leydig, Voit & Mayer, Ltd.

(57) ABSTRACT

The embodiments of the present invention disclose a method and an apparatus for determining a gain of a Raman optical amplifier and a Raman optical amplifier. The method includes: acquiring present gain parameter information of a Raman optical amplifier; and determining a present gain of a monitoring channel of the Raman optical amplifier according to the present gain parameter information and a correspondence between a gain of the monitoring channel of the Raman optical amplifier and gain parameter information. According to the method and apparatus for determining a gain of a Raman optical amplifier and the Raman optical amplifier that are in embodiments of the present invention, a present gain of a monitoring channel can be accurately determined; therefore, a gain spectrum of the Raman optical amplifier can be accurately monitored, and the gain of the (Continued)

Raman optical amplifier can be accurately adjusted to a target gain.

16 Claims, 8 Drawing Sheets

(51) Int. Cl.
 *H01S 3/13* (2006.01)
 *H04B 10/079* (2013.01)
 *H01S 3/131* (2006.01)

(52) U.S. Cl.
 CPC .......... *H01S 3/1306* (2013.01); *H01S 3/1312* (2013.01); *H01S 3/30* (2013.01); *H04B 10/079* (2013.01); *H01S 3/06754* (2013.01); *H01S 3/302* (2013.01)

(56) References Cited

U.S. PATENT DOCUMENTS

| | | |
|---|---|---|
| 2004/0052453 A1 | 3/2004 | Mao et al. |
| 2004/0091205 A1 | 5/2004 | Denkin et al. |
| 2004/0190123 A1* | 9/2004 | Nakamura et al. H04B 10/2942 359/337 |
| 2005/0024712 A1* | 2/2005 | Hiraizumi et al. . H01S 3/06754 359/334 |
| 2005/0105167 A1* | 5/2005 | Martinelli et al. ... G01M 11/319 359/334 |
| 2007/0109628 A1 | 5/2007 | Zhou et al. |
| 2007/0258132 A1 | 11/2007 | Zhou et al. |
| 2007/0291349 A1 | 12/2007 | Zhou et al. |
| 2008/0247034 A1 | 10/2008 | Zhou et al. |
| 2010/0073762 A1 | 3/2010 | Onaka |
| 2011/0141552 A1* | 6/2011 | Ghera ................ H04B 10/2916 359/334 |

FOREIGN PATENT DOCUMENTS

| | | |
|---|---|---|
| CN | 102790643 A | 11/2012 |
| WO | WO 2007130319 A2 | 11/2007 |

OTHER PUBLICATIONS

Kim et al., "Semianalytic Dynamic Gain-Clamping Method for the Fiber Raman Amplifier," IEEE Photonics Technology, vol. 17, Issue 4, pp. 768-770, Institute of Electrical and Electronics Engineers, New York, New York (Apr. 2005).

* cited by examiner

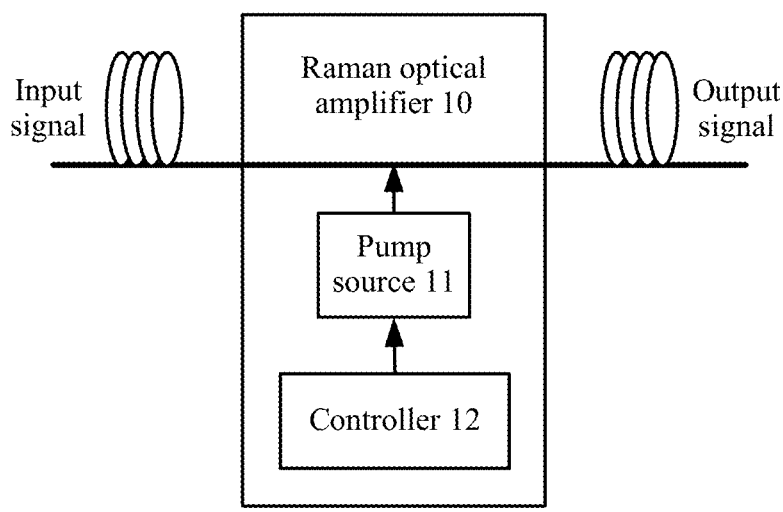

Acquire present gain parameter information of a Raman optical amplifier, where the present gain parameter information includes out-of-band amplified spontaneous emission ASE noise power information of the Raman optical amplifier, pump light power information of at least one pump source of the Raman optical amplifier, and power information of an output signal of the Raman optical amplifier ~ S110

Determine a present gain of a monitoring channel of the Raman optical amplifier according to the present gain parameter information and a correspondence between a gain of the monitoring channel of the Raman optical amplifier and gain parameter information ~ S120

FIG. 2

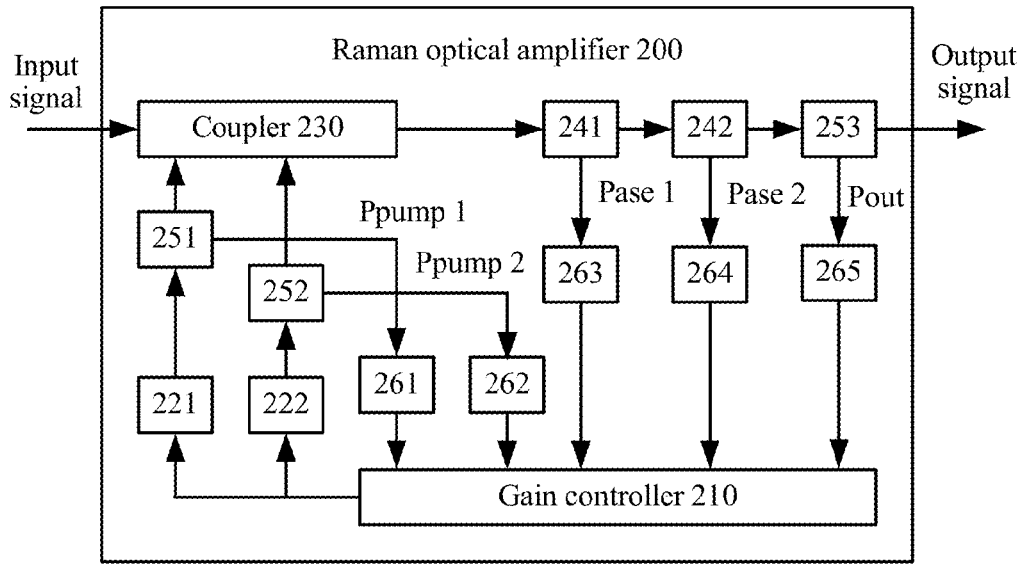

Acquire present gain parameter information of a Raman optical amplifier, where the present gain parameter information includes out-of-band amplified spontaneous emission ASE noise power information of the Raman optical amplifier, pump light power information of at least one pump source of the Raman optical amplifier, and power information of an output signal of the Raman optical amplifier ∿ S110

Determine a present gain of a monitoring channel of the Raman optical amplifier according to the present gain parameter information and a correspondence between a gain of the monitoring channel of the Raman optical amplifier and gain parameter information ∿ S120

Adjust the gain of the monitoring channel of the Raman optical amplifier to a target gain by controlling a pump light power of the at least one pump source of the Raman optical amplifier ∿ S130

┌─────────────────────────────────────────────────────────┐
│ Establish a correspondence between a gain of at least one │
│ monitoring channel including the monitoring channel and gain │ ～ S140
│ parameter information │
└─────────────────────────────────────────────────────────┘
                            │
┌─────────────────────────────────────────────────────────┐
│ Acquire present gain parameter information of a Raman optical │
│ amplifier, where the present gain parameter information includes │
│ out-of-band amplified spontaneous emission ASE noise power │
│ information of the Raman optical amplifier, pump light power │ ～ S110
│ information of at least one pump source of the Raman optical │
│ amplifier, and power information of an output signal of the │
│ Raman optical amplifier │
└─────────────────────────────────────────────────────────┘
                            │
┌─────────────────────────────────────────────────────────┐
│ Determine a present gain of a monitoring channel of the Raman │
│ optical amplifier according to the present gain parameter │
│ information and a correspondence between a gain of the │ ～ S120
│ monitoring channel of the Raman optical amplifier and gain │
│ parameter information │
└─────────────────────────────────────────────────────────┘
                            │
┌─────────────────────────────────────────────────────────┐
│ Adjust the gain of the monitoring channel of the Raman optical │
│ amplifier to a target gain by controlling a pump light power of the │ ～ S130
│ at least one pump source of the Raman optical amplifier │
└─────────────────────────────────────────────────────────┘

FIG. 7

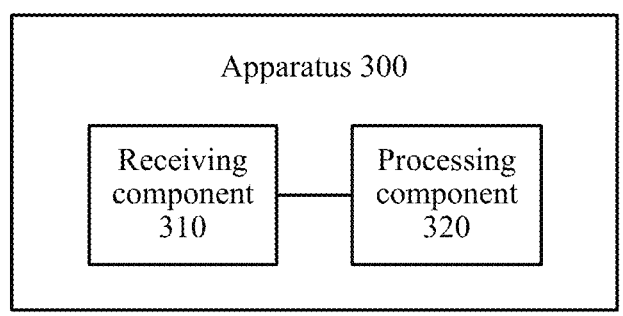

FIG. 8

METHOD AND APPARATUS FOR DETERMINING GAIN OF RAMAN OPTICAL AMPLIFIER AND RAMAN OPTICAL AMPLIFIER

CROSS-REFERENCE TO RELATED APPLICATIONS

This application is a continuation of International Application No. PCT/CN2014/071071, filed on Jan. 22, 2014, which is hereby incorporated by reference in its entirety.

TECHNICAL FIELD

The embodiments of the present invention relate to the communications field, and in particular, to a method and an apparatus for determining a gain of a Raman optical amplifier and a Raman optical amplifier in the communications field.

BACKGROUND

A Raman optical amplifier is an optical amplifier based on a Raman effect. The Raman effect means that when a beam of weak light and a beam of intense light enter a fiber simultaneously (in a same direction or in opposite directions), if a spectrum of the weak light just falls within a range of a Raman gain spectrum of the intense light, energy of the intense light is transferred to the weak light, so that the weak light is amplified. Therefore, in a communications network, signal light may be amplified based on the Raman effect, thereby increasing a transmission distance of the signal light.

During network running, because optical channel adding or dropping is caused by grooming, fiber cut, or the like, a distribution of transmission channels changes. For example, a quantity of transmission channels increases or decreases. For another example, a quantity of transmission channels does not change, but a distribution of the transmission channels in spectral space changes. The change in the distribution of the transmission channels causes a change in a gain of a Raman optical amplifier. In addition, interference between circuits or the like may lead to a change in a drive current or drive voltage of a pump source, and may further lead to a change in a pump light power, which may also lead to a change in the gain of the Raman optical amplifier. However, such changes of gains of output signal light may be accumulated in a concatenation link, and may cause a link fault. Therefore, such changes of gains need to be monitored in the communications network.

However, in the prior art, the change in the gain of the Raman optical amplifier can hardly be determined accurately for various reasons, and consequently, a communications network fault may be caused.

SUMMARY

Embodiments of the present invention provide a method and an apparatus for determining a gain of a Raman optical amplifier and a Raman optical amplifier, which can accurately determine a gain of a Raman optical amplifier, and therefore, a communications network fault caused by a change in the gain of the Raman optical amplifier can be avoided.

According to a first aspect, a method for determining a gain of a Raman optical amplifier is provided, where the method includes: acquiring present gain parameter information of a Raman optical amplifier, where the present gain parameter information includes out-of-band amplified spontaneous emission (ASE) noise power information of the Raman optical amplifier, pump light power information of at least one pump source of the Raman optical amplifier, and power information of an output signal of the Raman optical amplifier; and determining a present gain of a monitoring channel of the Raman optical amplifier according to the present gain parameter information and a correspondence between a gain of the monitoring channel of the Raman optical amplifier and gain parameter information.

With reference to the first aspect, in a first possible implementation manner of the first aspect, the out-of-band amplified spontaneous emission (ASE) noise power information includes at least one of a short-wave side out-of-band ASE noise power, a long-wave side out-of-band ASE noise power, or a total out-of-band ASE noise power; and the pump light power information of the at least one pump source includes at least one of a drive voltage of the at least one pump source, a drive current of the at least one pump source, or a power of output pump light of the at least one pump source.

With reference to the first aspect, in a second possible implementation manner of the first aspect, the out-of-band amplified spontaneous emission ASE noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

With reference to the first aspect, in a third possible implementation manner of the first aspect, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

With reference to the first aspect, in a fourth possible implementation manner of the first aspect, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

With reference to the first aspect or any possible implementation manner of the first to fourth possible implementation manners of the first aspect, in a fifth possible implementation manner of the first aspect, the method further includes: adjusting the gain of the monitoring channel of the Raman optical amplifier to a target gain by controlling a pump light power of the at least one pump source of the Raman optical amplifier.

With reference to the fifth possible implementation manner of the first aspect, in a sixth possible implementation manner of the first aspect, the controlling a pump light power of the at least one pump source of the Raman optical amplifier includes: determining a magnitude relationship between the present gain of the monitoring channel of the Raman optical amplifier and the target gain; and when the present gain of the monitoring channel is greater than the target gain, reducing the pump light power of the at least one pump source; or when the present gain of the monitoring channel is less than the target gain, increasing the pump light power of the at least one pump source.

With reference to the first aspect or any possible implementation manner of the first to sixth possible implementation manners of the first aspect, in a seventh possible implementation manner of the first aspect, the method further includes: before determining the present gain of the monitoring channel of the Raman optical amplifier, establishing a correspondence between a gain of at least one monitoring channel including the monitoring channel and gain parameter information.

With reference to the seventh possible implementation manner of the first aspect, in an eighth possible implementation manner of the first aspect, the at least one monitoring channel includes a transmission channel corresponding to an output-power peak value and/or output-power trough value of the Raman optical amplifier.

According to a second aspect, an apparatus for determining a gain of a Raman optical amplifier is provided, where the apparatus includes: a receiving component configured to receive information, where the receiving component has at least one input port; and a processing component connected to the receiving component, where the processing component is configured to: acquire present gain parameter information of a Raman optical amplifier, where the present gain parameter information includes out-of-band amplified spontaneous emission (ASE) noise power information of the Raman optical amplifier, pump light power information of at least one pump source of the Raman optical amplifier, and power information of an output signal of the Raman optical amplifier; and determine a present gain of a monitoring channel of the Raman optical amplifier according to the acquired present gain parameter information and a correspondence between a gain of the monitoring channel of the Raman optical amplifier and gain parameter information.

With reference to the second aspect, in a first possible implementation manner of the second aspect, the out-of-band amplified spontaneous emission (ASE) noise power information includes at least one of a short-wave side out-of-band ASE noise power, a long-wave side out-of-band ASE noise power, or a total out-of-band ASE noise power; and the pump light power information of the at least one pump source includes at least one of a drive voltage of the at least one pump source, a drive current of the at least one pump source, or a power of output pump light of the at least one pump source.

With reference to the second aspect, in a second possible implementation manner of the second aspect, the out-of-band amplified spontaneous emission (ASE) noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

With reference to the second aspect, in a third possible implementation manner of the second aspect, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

With reference to the second aspect, in a fourth possible implementation manner of the second aspect, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

With reference to the second aspect or any possible implementation manner of the first to fourth possible implementation manners of the second aspect, in a fifth possible implementation manner of the second aspect, the processing component is further configured to adjust the gain of the monitoring channel of the Raman optical amplifier to a target gain by controlling a pump light power of the at least one pump source of the Raman optical amplifier.

With reference to the fifth possible implementation manner of the second aspect, in a sixth possible implementation manner of the second aspect, the controlling a pump light power of the at least one pump source of the Raman optical amplifier by the processing component specifically includes: determining a magnitude relationship between the present gain of the monitoring channel of the Raman optical amplifier and the target gain; and when determining that the present gain of the monitoring channel is greater than the target gain, reducing the pump light power of the at least one pump source; or when determining that the present gain of the monitoring channel is less than the target gain, increasing the pump light power of the at least one pump source.

With reference to the second aspect or any possible implementation manner of the first to sixth possible implementation manners of the second aspect, in a seventh possible implementation manner of the second aspect, the processing component is further configured to: before determining the present gain of the monitoring channel of the Raman optical amplifier, establish a correspondence between a gain of at least one monitoring channel including the monitoring channel and gain parameter information.

With reference to the seventh possible implementation manner of the second aspect, in an eighth possible implementation manner of the second aspect, the at least one monitoring channel includes a transmission channel corresponding to an output-power peak value and/or output-power trough value of the Raman optical amplifier.

With reference to the second aspect or any possible implementation manner of the first to eighth possible implementation manners of the second aspect, in a ninth possible implementation manner of the second aspect, the apparatus further includes: at least one output port, configured to output the drive voltage or the drive current to the at least one pump source of the Raman optical amplifier; and the processing component includes a memory and a processor, where the memory is configured to store an instruction and the correspondence, and the processor is configured to execute the instruction stored in the memory.

With reference to the second aspect or any possible implementation manner of the first to ninth possible implementation manners of the second aspect, in a tenth possible implementation manner of the second aspect, the apparatus is an apparatus for determining a gain of a backward Raman optical amplifier.

According to a third aspect, a Raman optical amplifier is provided, where the Raman optical amplifier includes: the apparatus for determining a gain of a Raman optical amplifier according to an embodiment of the present invention; and at least one pump source for pumping the Raman optical amplifier, where the apparatus includes: a receiving component configured to receive information, where the receiving component has at least one input port; and a processing component connected to the receiving component, where the processing component is configured to: acquire present gain parameter information of the Raman optical amplifier, where the present gain parameter information includes out-of-band amplified spontaneous emission (ASE) noise power information of the Raman optical amplifier, pump light power information of the at least one pump source of the Raman optical amplifier, and power information of an output signal of the Raman optical amplifier; and determine a present gain of a monitoring channel of the Raman optical amplifier according to the acquired present gain parameter information and a correspondence between a gain of the monitoring channel of the Raman optical amplifier and gain parameter information.

With reference to the third aspect, in a first possible implementation manner of the third aspect, the Raman optical amplifier further includes: a coupler, configured to couple output pump light of the at least one pump source to an input fiber of the Raman optical amplifier; a wavelength selector, configured to acquire an out-of-band amplified spontaneous emission (ASE) noise of the Raman optical amplifier; a first photoelectric detector, configured to convert the out-of-band ASE noise into a first electrical signal, and input the first electrical signal to the processing component of the apparatus; and a second photoelectric detector, configured to convert an output signal of the Raman optical amplifier into a second electrical signal, and input the second electrical signal to the processing component of the apparatus.

With reference to the third aspect or the first possible implementation manner of the third aspect, in a second possible implementation manner of the third aspect, the Raman optical amplifier further includes at least one optical splitter and a third photoelectric detector, where: the at least one optical splitter is configured to split the output pump light of the at least one pump source into two parts, where one part of the pump light is input to the input fiber of the Raman optical amplifier, and the other part of the pump light is input to the third photoelectric detector; and the third photoelectric detector is configured to convert a received optical signal into a third electrical signal, and input the third electrical signal to the processing component of the apparatus.

Based on the foregoing technical solutions, according to the method and apparatus for determining a gain of a Raman optical amplifier and the Raman optical amplifier in the embodiments of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the method, the apparatus, and the Raman optical amplifier that are in the embodiments of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

BRIEF DESCRIPTION OF DRAWINGS

To describe the technical solutions in the embodiments of the present invention more clearly, the following briefly describes the accompanying drawings required for describing the embodiments of the present invention. The accompanying drawings in the following description show merely some embodiments of the present invention, and a person of ordinary skill in the art may still derive other drawings from these accompanying drawings without creative efforts.

FIG. 1 is a schematic block diagram of an application scenario according to an embodiment of the present invention;

FIG. 2 is a schematic flowchart of a method for determining a gain of a Raman optical amplifier according to an embodiment of the present invention;

FIG. 3 is a schematic block diagram of another application scenario according to an embodiment of the present invention;

FIG. 4 is another schematic flowchart of a method for determining a gain of a Raman optical amplifier according to an embodiment of the present invention;

FIG. 7 is still another schematic flowchart of a method for determining a gain of a Raman optical amplifier according to an embodiment of the present invention;

FIG. 8 is a schematic block diagram of an apparatus for determining a gain of a Raman optical amplifier according to an embodiment of the present invention;

DESCRIPTION OF EMBODIMENTS

Figure 5:
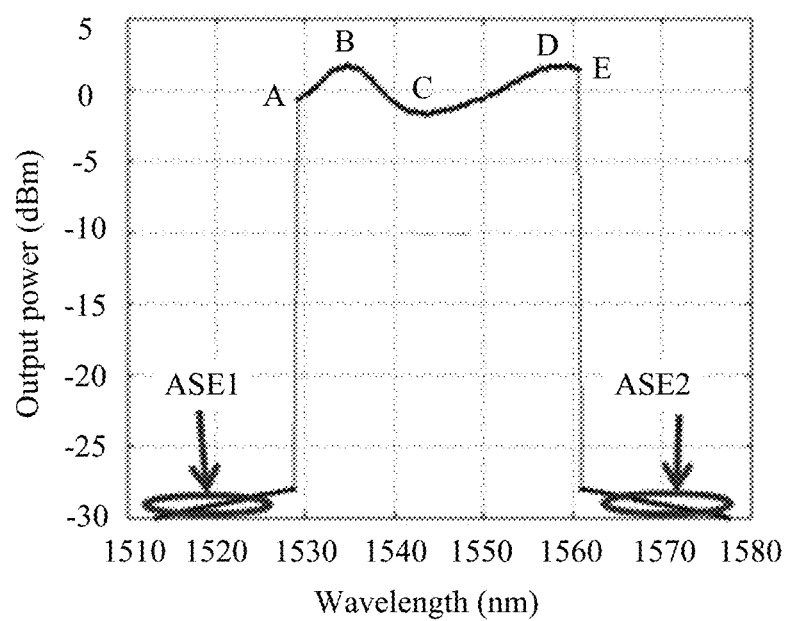
FIG. 5 is a plot of a gain spectrum of a Raman optical amplifier according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

FIG. 1 shows a schematic block diagram of an application scenario according to an embodiment of the present invention. As shown in FIG. 1, an input signal is output after being amplified by a Raman optical amplifier 10, where the Raman optical amplifier 10 may include a pump source 11 and a controller 12. The pump source 11 is configured to output pump light, and the controller 12 is configured to control a drive current or a drive voltage of the pump source 11, to control a power of pump light output by the pump source 12.

Different from a commonly used erbium-doped fiber amplifier in a current optical communications system, where a special fiber needs to be used as a gain medium, the Raman optical amplifier can use a transmission fiber in a link as a gain medium. Therefore, the Raman optical amplifier can be made into a distributed amplifier, and the optical amplifier can amplify signal light by using the transmission fiber, requiring including only a pump source and a control system. In addition, if pump light of multiple different wavelengths is used simultaneously to pump the Raman optical amplifier, a wide gain spectrum can be obtained, and a gain spectrum with good flatness can be obtained within a wide range by controlling a pump power of pump light.

In a current dense wavelength division multiplexing system, a fiber generally transmits 40 or 80 channels of optical signals simultaneously. During network running, because optical channel adding or dropping is caused by grooming, fiber cut, or the like, a distribution of transmission channels changes. For example, a quantity of transmission channels increases or decreases. For another example, a quantity of transmission channels does not change, but a distribution of the transmission channels in spectral space changes. For example, for a link in which a total quantity of transmission channels is 80, due to a reason such as grooming or fiber cut, signals on 20 transmission channels do not pass through a certain span. Therefore, a quantity of channels for transmitting signal light in the span decreases from 80 to 60. At an input end of the link, an input power of an optical signal on each transmission channel does not change, but a quantity of transmission channels decreases. Therefore, a total power of input signal light decreases correspondingly, so that energy absorbed by the input signal light from pump light decreases, power of the remaining pump light in the link increases, and energy of the pump light is more centrally allocated to the remaining signal light. As a result, a gain of the remaining signal light in the link increases. Therefore, a decrease in a quantity of transmission channels causes an increase in a gain of signal light at an output end. In contrast, an increase in the quantity of transmission channels causes a decrease in the gain of the signal light at the output end. In addition, a change in the power of the output pump light output by the pump source also causes a change in a gain of the Raman optical amplifier. Such changes of gains may be accumulated in a concatenation link, and may cause a link fault. Therefore, a change in a gain of the Raman optical amplifier needs to be determined and monitored in the communications system. In this way, such a dynamic change in the gain can be suppressed, and transmission performance of the communications network can be improved.

FIG. 2 shows a schematic flowchart of a method 100 for determining a gain of a Raman optical amplifier according to an embodiment of the present invention. The method 100 may be performed by an apparatus for determining a gain of a Raman optical amplifier. For example, the apparatus may be a Raman optical amplifier, or the apparatus may be a gain controller disposed in a Raman optical amplifier, for example, the controller 12 shown in FIG. 1. As shown in FIG. 2, the method 100 includes:

S110. Acquire present gain parameter information of a Raman optical amplifier, where the present gain parameter information includes out-of-band amplified spontaneous emission (ASE) noise power information of the Raman optical amplifier, pump light power information of at least one pump source of the Raman optical amplifier, and power information of an output signal of the Raman optical amplifier.

S120. Determine a present gain of a monitoring channel of the Raman optical amplifier according to the present gain parameter information and a correspondence between a gain of the monitoring channel of the Raman optical amplifier and gain parameter information.

Specifically, in order to accurately determine a present gain of the Raman optical amplifier, so that a gain of a Raman optical amplifier can be monitored and controlled accurately, the apparatus for determining a gain of a Raman optical amplifier may first acquire the out-of-band ASE noise power information of the Raman optical amplifier, the pump light power information of the at least one pump source of the Raman optical amplifier, and the power information of the output signal of the Raman optical amplifier in real time. Then, the apparatus for determining a gain of a Raman optical amplifier may determine, based on a preset or newly established or acquired correspondence between a gain of a monitoring channel of the Raman optical amplifier and gain parameter information, the present gain of the monitoring channel of the Raman optical amplifier in a case of the existing present gain parameter information, so as to accurately monitor and control a gain spectrum of the Raman optical amplifier.

Therefore, according to the method for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the method in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

In addition, according to the method for determining a gain of a Raman optical amplifier in this embodiment of the present invention, a gain of a Raman optical amplifier may be determined without acquiring or determining a power of an input signal of the Raman optical amplifier. Therefore, according to the method, a gain of a distributed Raman optical amplifier whose signal input end and output end are not in a same location can be accurately and conveniently determined. In addition, according to the method for determining a gain of a Raman optical amplifier in this embodiment of the present invention, a gain of a Raman optical amplifier may be determined without adding an extra monitoring light source, which can not only reduce costs but also further reduce a system risk that may be caused by the monitoring light source. In addition, according to the method in this embodiment of the present invention, multiple factors that affect the gain of the Raman optical amplifier are considered; therefore, the correspondence is applicable not only in a scenario of a low gain but also in a scenario of a high gain, and a problem in the prior art can be avoided that the correspondence is applicable only in a scenario of a low gain but control is inaccurate in a scenario of a high gain.

It should be understood that in this embodiment of the present invention, the Raman optical amplifier may include one or more pump sources configured to pump the Raman optical amplifier, where the pump source may be a first-order pump source or may be a second-order pump source or may be another higher-order pump source. This embodiment of the present invention is described only by using the first-order pump source as an example, but the present invention is not limited thereto.

It should also be understood that in this embodiment of the present invention, the Raman optical amplifier may be a forward Raman optical amplifier, or may be a backward Raman optical amplifier, where the forward Raman optical amplifier refers to a Raman optical amplifier in which a propagation direction of pump light is consistent with a propagation direction of signal light, and the backward Raman optical amplifier refers to a Raman optical amplifier in which a propagation direction of pump light is opposite to a propagation direction of signal light. This embodiment of the present invention is described only by using the backward Raman optical amplifier as an example, but the present invention is not limited thereto.

Specifically, in step S110, the apparatus for determining a gain of a Raman optical amplifier may acquire the present gain parameter information of the Raman optical amplifier by using multiple methods.

For example, the apparatus for determining a gain of a Raman optical amplifier may first acquire a small part of signal light in the signal light by using an optical splitter; next, this part of signal light is incident on a wavelength selector, so that an out-of-band amplified spontaneous emission (ASE) noise of the Raman optical amplifier is acquired; finally, the out-of-band ASE noise may be received by a photoelectric detector, and the out-of-band ASE noise power information of the Raman optical amplifier is determined. For example, the wavelength selector may be a filter, a wavelength division multiplexer (WDM), or the like.

In this embodiment of the present invention, the out-of-band ASE noise power information may include at least one of a short-wave side out-of-band ASE noise power, a long-wave side out-of-band ASE noise power, or a total out-of-band ASE noise power. For example, when the Raman optical amplifier includes only one pump source, the short-wave side out-of-band ASE noise power of the Raman optical amplifier may be acquired, or only the long-wave side out-of-band ASE noise power of the Raman optical amplifier may be acquired, or only the total out-of-band ASE noise power of the Raman optical amplifier may be acquired. For another example, when the Raman optical amplifier includes only more than two pump sources, the short-wave side out-of-band ASE noise power and the long-wave side out-of-band ASE noise power of the Raman optical amplifier may be acquired, or the short-wave side out-of-band ASE noise power and the total out-of-band ASE noise power of the Raman optical amplifier may be acquired, or the long-wave side out-of-band ASE noise power and the total out-of-band ASE noise power of the Raman optical amplifier may be acquired, but this embodiment of the present invention is not limited thereto.

It should be understood that in this embodiment of the present invention, "long-wave side" and "short-wave side" are described relative to a wavelength of a data signal channel of the Raman optical amplifier. For example, "long-wave side" refers to a band of wavelengths longer than the wavelength of the data signal channel of the Raman optical amplifier; "short-wave side" refers to a band of wavelengths shorter than the wavelength of the data signal channel of the Raman optical amplifier. For another example, if a wavelength range of the data signal channel of the Raman optical amplifier is 1530 nm to 1560 nm, a wavelength range of "long-wave side" may be 1560 nm to 1580 nm, and a wavelength range of "short-wave side" may be 1510 nm to 1530 nm, but the present invention is not limited thereto.

For example, the apparatus for determining a gain of a Raman optical amplifier may first acquire a power of a pump light output by the pump source of the Raman optical amplifier, or acquire a power of an output signal of the Raman optical amplifier by combining an optical splitter with a photoelectric detector. For another example, the apparatus for determining a gain of a Raman optical amplifier may determine the power of the pump light output by the pump source or the like according to a drive current or a drive voltage that is output by the controller and that is used for controlling the pump source, but this embodiment of the present invention is not limited thereto.

In this embodiment of the present invention, optionally, the out-of-band amplified spontaneous emission (ASE) noise power information includes at least one of the short-wave side out-of-band ASE noise power, the long-wave side out-of-band ASE noise power, or the total out-of-band ASE noise power; and the pump light power information of the at least one pump source includes at least one of a drive voltage of the at least one pump source, a drive current of the at least one pump source, or a power of output pump light of the at least one pump source.

It should be understood that in this embodiment of the present invention, in order not to affect normal running of the network, when the present gain parameter information of the Raman optical amplifier is acquired, generally an optical splitting method may be used to acquire a part of signal light for detection or measurement. Therefore, there may be a proportionality coefficient between a result obtained by measuring the part of signal light and a result obtained by measuring all signal light that is not split, where the proportionality coefficient may be, for example, a split ratio of a splitter. For example, the power information of the output signal of the Raman optical amplifier may include powers of all output signals, or may include powers of some output signals obtained by using the splitter.

Therefore, in this embodiment of the present invention, the acquired present gain parameter information of the Raman optical amplifier may include gain parameter information obtained by measuring a part of signal light or may include gain parameter information obtained by measuring all signal light, but the present invention is not limited thereto.

It should be understood that this embodiment of the present invention is described by using only an example in which the gain parameter information includes the foregoing three types of information, but the present invention is not limited thereto. For example, the gain parameter information of the Raman optical amplifier may further include other information in addition to the out-of-band ASE noise power information, the power information of the power of the output pump light output by the pump source, and the power information of the output signal.

The following uses a Raman optical amplifier 200 in an application scenario shown in FIG. 3 as an example to describe in detail the method for determining a gain of a Raman optical amplifier according to this embodiment of the present invention.

As shown in FIG. 3, the Raman optical amplifier 200 includes a first pump source 221 and a second pump source 222. Pump light, output by the two pump sources, with different wavelengths is coupled into a fiber of an input link by using, for example, a coupler 230, where a transmission direction of the pump light is opposite to a propagation direction of input signal light, that is, the Raman optical amplifier 200 is a backward Raman optical amplifier. It should be understood that the coupler is, for example, a wavelength division multiplexer (WDM). It should also be understood that the pump light may also be coupled into the fiber of the input link in another manner, but this embodiment of the present invention is not limited thereto.

Before the pump light output by the first pump source 221 and the pump light output by the second pump source 222 enter a coupler, a small part of the pump light may be split separately by a first optical splitter (TAP) 251 and a second optical splitter 252, and powers of the parts of pump light are determined separately by a first photoelectric detector 261 and a second photoelectric detector 262 and are fed back to a gain controller 210, so as to monitor the power Ppump1 of the pump light output by the pump source 221 and the power Ppump2 of the pump light output by the pump source 222. In addition, it should be understood that the gain controller 210 controls the power of the pump light output by the pump source by using a drive current or a drive voltage output by the pump source. Therefore, the gain controller 210 may also determine, according to the output drive current or the drive voltage, the power of the pump light output by the pump source.

After passing through the coupler 230, the input signal light may pass through a first wavelength selector 241, a second wavelength selector 242, and a third optical splitter 253 and then is output to a downstream link. The first wavelength selector 241 and the second wavelength selector 242 may be filters, or may be wavelength division multiplexers (WDMs), so as to filter out long-wave side and short-wave side out-of-band ASE noises of the Raman optical amplifier 200 separately. A third photoelectric detector 263 and a fourth photoelectric detector 264 respectively determine powers of the noises and then feed back the powers of the noises to the gain controller 210, so as to monitor a short-wave side out-of-band ASE noise power Pase1 and a long-wave side out-of-band ASE noise power Pase2 of the Raman optical amplifier 200. A fifth photoelectric detector 265 determines, by using a part of signal light split by the third optical splitter 253, a power of the output signal and feeds back the power to the gain controller 210, so as to monitor the power Pout of the output signal of the Raman optical amplifier 200.

Therefore, during actual running of the Raman optical amplifier 200, by using information fed back by the photoelectric detectors 261 to 265, the gain controller 210 may instantly acquire out-of-band amplified spontaneous emission (ASE) noise power information of the Raman optical amplifier 200, pump light power information of at least one pump source of the Raman optical amplifier, and power information of an output signal of the Raman optical amplifier.

It should be understood that this embodiment of the present invention is described only by using an application scenario shown in FIG. 3 as an example, but the present invention is not limited thereto. According to the method in this embodiment of the present invention, the present gain parameter information of the Raman optical amplifier may also be acquired by using another method.

Specifically, in step S120, the apparatus for determining a gain of a Raman optical amplifier may determine the present gain of the monitoring channel of the Raman optical amplifier according to the present gain parameter information and the correspondence between a gain of the monitoring channel of the Raman optical amplifier and gain parameter information.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

For example, still using the application scenario shown in FIG. 3 as an example for description, the gain controller 210 may determine, according to a predetermined correspondence between a gain of the monitoring channel of the Raman optical amplifier and gain parameter information, the present gain of the monitoring channel of the Raman optical amplifier in a case of the present gain parameter information, where the correspondence between a gain of the monitoring channel and gain parameter information may be determined according to the following formula (1):

$$\mathrm{Gain}\_i = A1\_i + B1\_i \times P\mathrm{pump}1 + C1\_i \times P\mathrm{pump}2 + D1\_i \times P\mathrm{out} + E1\_i \times P\mathrm{ase}1 + F1\_i \times P\mathrm{ase}2 \quad (1)$$

where i is a monitoring channel number of the Raman optical amplifier; Gain_i is a gain of the $i^{th}$ monitoring channel; Ppump1 and Ppump2 are powers of pump light output by two pump sources respectively; Pout is a power of an output signal of the Raman optical amplifier; Pase1 and Pase2 are a short-wave side out-of-band ASE noise power and a long-wave side out-of-band ASE noise power respectively; A1_i, B1_i, C1_i, D1_i, E1_i, and F1_i are gain parameter coefficients of the $i^{th}$ monitoring channel.

For another example, the correspondence between a gain of the monitoring channel of the Raman optical amplifier and gain parameter information may be determined according to the following formula (2):

$$Gain\_i = A2\_i + B2\_i \times Ppump1 + C2\_i \times Ppump2 + D2\_i \times Pout + E2\_i \times Pase1 + F2\_i \times Pase2 + G2\_i \times Pase1^2 + H2\_i \times Pase2^2 + J2\_i \times Pase1 \times Pase2 \quad (2)$$

where i is a monitoring channel number of the Raman optical amplifier; Gain_i is a gain of the $i^{th}$ monitoring channel; Ppump1 and Ppump2 are powers of pump light output by two pump sources respectively; Pout is a power of an output signal of the Raman optical amplifier; Pase1 and Pase2 are a short-wave side out-of-band ASE noise power and a long-wave side out-of-band ASE noise power respectively; A2_i, B2_i, C2_i, D2_i, E2_i, F2_i, G2_i, H2_i, and J2_i are gain parameter coefficients of the $i^{th}$ monitoring channel.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

For example, still using the application scenario shown in FIG. 3 as an example for description, the correspondence between a gain of the monitoring channel of the Raman optical amplifier and gain parameter information may be determined according to the following formula (3):

$$Gain\_i = A3\_i + B3\_i \times Vdrive1 + C3\_i \times Vdrive2 + D3\_i \times Pout + E3\_i \times Pase1 + F3\_i \times Pase2 \quad (3)$$

where i is a monitoring channel number of the Raman optical amplifier; Gain_i is a gain of the $i^{th}$ monitoring channel; Vdrive1 and Vdrive2 are drive voltages of two pump sources respectively; Pout is a power of an output signal of the Raman optical amplifier; Pase1 and Pase2 are a short-wave side out-of-band ASE noise power and a long-wave side out-of-band ASE noise power respectively; A3_i, B3_i, C3_i, D3_i, E3_i, and F3_i are gain parameter coefficients of the $i^{th}$ monitoring channel.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

For example, still using the application scenario shown in FIG. 3 as an example for description, the correspondence between a gain of the monitoring channel of the Raman optical amplifier and gain parameter information may be determined according to the following formula (4):

$$Gain\_i = A4\_i + B4\_i \times Idrive1 + C4\_i \times Idrive2 + D4\_i \times Pout + E4\_i \times Pase1 + F4\_i \times Pase2 \quad (4)$$

where i is a monitoring channel number of the Raman optical amplifier; Gain_i is a gain of the $i^{th}$ monitoring channel; Idrive1 and Idrive2 are drive currents of two pump sources respectively; Pout is a power of an output signal of the Raman optical amplifier; Pase1 and Pase2 are a short-wave side out-of-band ASE noise power and a long-wave side out-of-band ASE noise power respectively; A4_i, B4_i, C4_i, D4_i, E4_i, and F4_i are gain parameter coefficients of the $i^{th}$ monitoring channel.

It should be understood that the foregoing formulas (1) to (4) are only used as examples for description in this embodiment of the present invention, but the present invention is not limited thereto. For example, the out-of-band amplified spontaneous emission (ASE) noise power information includes a short-wave side out-of-band ASE noise power and a long-wave side out-of-band ASE noise power; the pump light power information of the at least one pump source includes a power of output pump light of each pump source; and in the correspondence, each combination of the short-wave side out-of-band ASE noise power, the long-wave side out-of-band ASE noise power, the power of the output pump light of each pump source, and the power information of the output signal corresponds to one gain of the monitoring channel. For another example, the out-of-band amplified spontaneous emission (ASE) noise power information includes a short-wave side out-of-band ASE noise power and a long-wave side out-of-band ASE noise power; the pump light power information of the at least one pump source includes a power of output pump light of each pump source and a drive voltage; and in the correspondence, each combination of the short-wave side out-of-band ASE noise power, the long-wave side out-of-band ASE noise power, the power of the output pump light of each pump source, the drive voltage, and the power information of the output signal corresponds to one gain of the monitoring channel.

It should also be understood that in this embodiment of the present invention, function relationships shown in the formulas (1) to (4) are only used as examples for describing the correspondence between a gain of the monitoring channel of the Raman optical amplifier and gain parameter information, but the present invention is not limited thereto. The correspondence between a gain of the monitoring channel of the Raman optical amplifier and gain parameter information may also be in another form, for example, in a form of a correspondence table.

It should be understood that in this embodiment of the present invention, the correspondence between a gain of the monitoring channel of the Raman optical amplifier and gain parameter information is a correspondence between a gain of the monitoring channel and out-of-band ASE noise power information, pump light power information of at least one pump source, and power information of an output signal of the Raman optical amplifier, but the present invention is not limited thereto. The correspondence may also include a correspondence between a gain of the monitoring channel and at least one type of reference information of the gain parameter information. For example, the correspondence is a correspondence between a gain of the monitoring channel and a short-wave side out-of-band ASE noise power and a long-wave side out-of-band ASE noise power. For another example, the correspondence is a correspondence between a gain of the monitoring channel and out-of-band ASE noise power information and pump light power information, but the present invention is not limited thereto.

It should also be understood that in this embodiment of the present invention, the acquired present gain parameter information of the Raman optical amplifier may include gain parameter information obtained by measuring a part of signal light or gain parameter information obtained by measuring all signal light. Correspondingly, in this embodiment of the present invention, the correspondence used for determining the present gain of the monitoring channel of the Raman optical amplifier may include a correspondence between the gain parameter information of the part of signal light and a gain of the monitoring channel of the Raman optical amplifier or a correspondence between the gain parameter information of all the signal light and a gain of the monitoring channel of the Raman optical amplifier, but the present invention is not limited thereto.

Therefore, according to the method for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the method in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

In an embodiment of the present invention, optionally, as shown in FIG. 4, the method 100 further includes:

S130. Adjust the gain of the monitoring channel of the Raman optical amplifier to a target gain by controlling a pump light power of the at least one pump source of the Raman optical amplifier.

Specifically, the controlling a pump light power of the at least one pump source of the Raman optical amplifier includes:

determining a magnitude relationship between the present gain of the monitoring channel of the Raman optical amplifier and the target gain; and when the present gain of the monitoring channel is greater than the target gain, reducing the pump light power of the at least one pump source; or when the present gain of the monitoring channel is less than the target gain, increasing the pump light power of the at least one pump source.

In this embodiment of the present invention, multiple monitoring channels of the Raman optical amplifier may be set, and multiple target gains may also be set. The gain of the monitoring channel of the Raman optical amplifier may be adjusted to the target gain according to a magnitude relationship between each target gain and a gain of one or more monitoring channels or by increasing and reducing a power, corresponding to the target gain, of output pump light of a pump source, so as to control the gain of the Raman optical amplifier. In this way, a communications network fault caused by a change in the gain of the Raman optical amplifier can be avoided, performance of the Raman optical amplifier can be improved, and transmission performance of the communications network is further improved.

Still using the application scenario shown in FIG. 3 as an example, for the Raman optical amplifier 200 including two pump sources 221 and 222, a gain spectrum of input signal light amplified by the Raman optical amplifier is shown in FIG. 5. An output power of the Raman optical amplifier has two peak values B and D and one output-power trough value C. In this embodiment of the present invention, the apparatus for controlling a gain of a Raman optical amplifier may determine that all three transmission channels corresponding to the output-power peak values and the output-power trough value are monitoring channels, and therefore can more accurately control a power of a pump source of the Raman optical amplifier and more accurately control the gain of the Raman optical amplifier.

Assuming that G1 is a gain of a transmission channel corresponding to the output-power peak value B, that G2 is a gain of a transmission channel corresponding to the output-power peak value D, and that G3 is a gain of a transmission channel corresponding to the output-power trough value C, the apparatus for determining a gain of a Raman optical amplifier may compare an average value of G1 and G3 with a first target gain. If the average value of G1 and G3 is greater, it indicates that the power of the first pump source 221 is higher, and the power of the first pump source 221 needs to be reduced; otherwise, if the average value of G1 and G3 is smaller, it indicates that the power of the first pump source 221 is lower, and the power of the first pump source 221 needs to be increased. On the other hand, the apparatus for controlling a gain of a Raman optical amplifier may compare an average value of G2 and G3 with a second target gain. If the average value of G2 and G3 is greater, it indicates that the power of the second pump source 222 is higher, and the power of the second pump source 222 needs to be reduced; otherwise, if the average value of G2 and G3 is smaller, it indicates that the power of the second pump source 222 is lower, and the power of the second pump source 222 needs to be increased.

The first target gain corresponds to the first pump source, and the second target gain corresponds to the second pump source. The first target gain and the second target gain may be equal, or may be unequal. When the first target gain and the second target gain are equal, the apparatus for determining a gain of a Raman optical amplifier may level a gain spectral line; when the first target gain and the second target gain are unequal, the apparatus for determining a gain of a Raman optical amplifier may tilt a gain spectral line. The present invention is not limited thereto.

Figure 6:
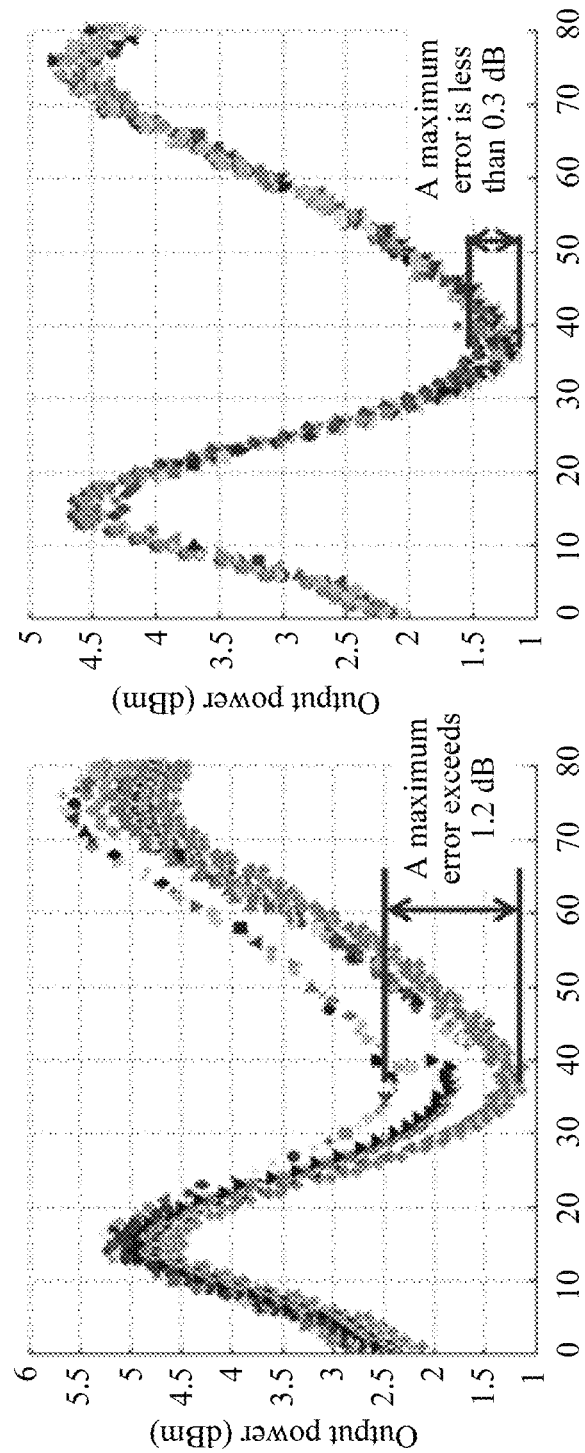
FIG. 6 is a plot of a simulation result of determining a gain of a Raman optical amplifier according to an embodiment of the present invention.

In this embodiment of the present invention, control on the gain of the Raman optical amplifier is simulated based on any formula of the foregoing formulas (1) to (4). A simulation result indicates that according to the method in this embodiment of the present invention, a gain error can be controlled within 0.3 dB, as shown in the right figure in FIG. 6. However, a maximum error existing when the gain of the Raman optical amplifier is controlled based on the prior art exceeds 1.2 dB, as shown in the left figure in FIG. 6. In the left figure and right figure in FIG. 6, a horizontal coordinate indicates a quantity of channels of the Raman optical amplifier, and a vertical coordinate indicates an output power.

Therefore, according to the method for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the method in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

In this embodiment of the present invention, the correspondence between a gain of the monitoring channel of the Raman optical amplifier and gain parameter information may be preset, or may be sent by another device to the apparatus for determining a gain of a Raman optical amplifier, or may be a correspondence newly established by the apparatus.

Optionally, as shown in FIG. 7, the method 100 further includes:

S140. Before determining the present gain of the monitoring channel of the Raman optical amplifier, establish a correspondence between a gain of at least one monitoring channel including the monitoring channel and gain parameter information.

The following describes in detail how to establish a correspondence between a gain of the monitoring channel of the Raman optical amplifier and gain parameter information with reference to the application scenario shown in FIG. 3.

Optionally, in this embodiment of the present invention, as shown in FIG. 4, the establishing a correspondence between a gain of at least one monitoring channel including the monitoring channel and gain parameter information includes:

determining, in multiple transmission channels of the Raman optical amplifier, at least one monitoring channel that is used to monitor a gain and that includes the monitoring channel;

for multiple pump source power combinations that the pump source of the Raman optical amplifier has, determining a first gain of each monitoring channel of the at least one monitoring channel in each pump source power combination, and first gain parameter information of the Raman optical amplifier in each pump source power combination; and establishing a correspondence between a gain of the monitoring channel of the Raman optical amplifier and gain parameter information according to the first gain and the first gain parameter information in each pump source power combination.

It should be understood that for the multiple pump source power combinations that the pump source has, only a power of the pump source changes, but none of other factors changes. For example, a distribution of transmission channels does not change, that is, a wavelength of an input signal, a quantity of channels, and the like do not change.

Specifically, the determining, in multiple transmission channels of the Raman optical amplifier, at least one monitoring channel that is used to monitor a gain, includes:

determining that a transmission channel corresponding to an output-power peak value and/or output-power trough value of the Raman optical amplifier is a monitoring channel of the at least one monitoring channel.

For example, in this embodiment of the present invention, the apparatus for determining a gain of a Raman optical amplifier may determine that all the three transmission channels corresponding to the output-power peak values B and D and the output-power trough value C are monitoring channels, as shown in FIG. 5.

In this embodiment of the present invention, optionally, the determining at least one monitoring channel that is used to monitor a gain includes:

determining that a transmission channel corresponding to a specific output power of the Raman optical amplifier is a monitoring channel of the at least one monitoring channel, where a difference between the specific output power and the output-power peak value or the output-power trough value of the Raman optical amplifier is a predetermined power value.

That is, in this embodiment of the present invention, in addition to determining that the transmission channel corresponding to the output-power peak value and/or the output-power trough value of the Raman optical amplifier is a monitoring channel, a transmission channel corresponding to a specific output power of the Raman optical amplifier may also be determined as a monitoring channel, but the present invention is not limited thereto.

For example, in this embodiment of the present invention, another transmission channel of the Raman optical amplifier may also be determined as a monitoring channel. For example, a transmission channel to which an output power between A and B is corresponding may be determined a monitoring channel, or a transmission channel to which an output power between D and E is corresponding may be determined as a monitoring channel. However, it should be understood that in this embodiment of the present invention, preferably, the at least one monitoring channel used for monitoring a gain not only includes a transmission channel to which an output power at the left of the output-power trough value in the power curve shown in FIG. 5 is corresponding, but also includes a transmission channel to which an output power at the right of the output-power trough value in the power curve shown in FIG. 5 is corresponding, so that the gain spectrum of the Raman optical amplifier is monitored more accurately.

In this embodiment of the present invention, the determining a first gain of each monitoring channel of the at least one monitoring channel in each pump source power combination includes:

for each pump source power combination of the pump source of the Raman optical amplifier, determining an off output power of an output signal on each monitoring channel of the at least one monitoring channel when the pump source is turned off, and an on output power of an output signal on each monitoring channel when the pump source is turned on; and determining that a difference between the on output power of each monitoring channel and the off output power of each monitoring channel is the first gain of each monitoring channel in each pump source power combination.

Specifically, still using the Raman optical amplifier 200 shown in FIG. 3 as an example, the three transmission channels Psig1, Psig2, and Psig3 corresponding to the output-power peak values and the output-power trough value are determined as the monitoring channels.

In a case in which two pump sources of the Raman optical amplifier are turned off, through measurement of an output signal of the Raman optical amplifier, an output power curve Poff of input signal light after fiber transmission may be obtained. Therefore, off output powers of output signals on the three monitoring channels Psig1, Psig2, and Psig3 when the pump sources are turned off may be obtained, and are respectively marked as Psig1off, Psig2off, and Psig3off in a unit of dBm.

Afterward, the two pump sources of the Raman optical amplifier may be turned on, so that the Raman optical amplifier amplifies input signal light. In this case, through the first photoelectric detector 261, the second photoelectric detector 262, the third photoelectric detector 263, the fourth photoelectric detector 264, and the fifth photoelectric detector 265, a power Ppump1 of the pump light output by the first pump source 221 of the Raman optical amplifier 200, a power Ppump2 of the pump light output by the second pump source 222, a short-wave side out-of-band ASE noise power Pase1, a long-wave side out-of-band ASE noise power Pase2, and a power Pout of an output signal of the Raman optical amplifier 200 may be acquired.

It should be understood that when the Raman optical amplifier has one pump source, or when the Raman optical amplifier has three or more pump sources, based on a similar structure, the apparatus for determining a gain of a Raman optical amplifier may acquire present gain parameter information of the Raman optical amplifier, which is not described herein again for brevity.

In addition, an output power curve of input signal light that is amplified by the Raman optical amplifier may be obtained by measuring an output signal of the Raman optical amplifier. In this case, on output powers of the output signals on the three monitoring channels Psig1, Psig2, and Psig3 when the pump sources are turned on may be obtained, and are respectively marked as Psig1on, Psig2on, and Psig3on in a unit of dBm. Therefore, first gains G1, G2, and G3 (in a unit of dB) of the three monitoring channels Psig1, Psig2, and Psig3 in a first pump source power combination are respectively:

$G1 = P\text{sig1on} - P\text{sig1off};$ $G2 = P\text{sig2on} - P\text{sig2off};$ and $G3 = P\text{sig3on} - P\text{sig3off}.$ It should be understood that when the powers of the output signals on the three monitoring channels Psig1, Psig2, and Psig3 during turning off or turning on of the pump sources are in a unit of watt (W) or milliwatt (mW), the first gains may be ratios of output signal powers existing when the pump sources are turned on to output signal powers existing when the pump sources are turned off.

In addition, within normal working ranges of the first pump source 221 and the second pump source 222, multiple pump source power combinations may be obtained by changing powers of the first pump source 221 and the second pump source 222 respectively. In this case, other parameters related to the gains remain unchanged. According to the first gain and the corresponding first gain parameter information in each pump source power combination, the correspondence between a gain of the monitoring channel of the Raman optical amplifier and gain parameter information may be established by using methods such as fitting.

Therefore, the apparatus for determining a gain of a Raman optical amplifier may establish the correspondence between a gain of the monitoring channel of the Raman optical amplifier and gain parameter information according to the first gain and the first gain parameter information in each pump source power combination. In this way, the apparatus for determining a gain of a Raman optical amplifier may acquire the present gain parameter information of the Raman optical amplifier in real time, and determine the present gain of the monitoring channel of the Raman optical amplifier according to the correspondence. Therefore, the power of the at least one pump source of the Raman optical amplifier may be controlled according to a magnitude relationship between the present gain of the monitoring channel of the Raman optical amplifier and the target gain, thereby controlling the gain of the Raman optical amplifier.

In this embodiment of the present invention, in addition to fitting the correspondence between a gain and gain parameter information by considering powers of different pump sources, the correspondence between a gain and gain parameter information may also be fitted by considering different distributions of transmission channels, so that the correspondence can be better applied to different application scenarios, and therefore accuracy of control on the gain of the Raman optical amplifier can be further improved. It should be understood that the change in the distribution of transmission channels not only includes an increase or a decrease in the quantity of transmission channels, but also includes a case in which the quantity of transmission channels does not change but a distribution of the transmission channels in spectral space changes, or the like.

Optionally, in this embodiment of the present invention, the establishing a correspondence between a gain of the monitoring channel of the Raman optical amplifier and gain parameter information according to the first gain and the first gain parameter information in each pump source power combination includes:

for multiple distributions of transmission channels that the Raman optical amplifier has (multiple distributions of transmission channels caused by different cases of optical channel adding or dropping), determining a second gain of each monitoring channel of the at least one monitoring channel in each distribution of transmission channels and second gain parameter information of the Raman optical amplifier in each distribution of transmission channels; and establishing a correspondence between a gain of the monitoring channel of the Raman optical amplifier and gain parameter information according to the first gain and the first gain parameter information in each pump source power combination and according to the second gain and the second gain parameter information in each distribution of transmission channels.

It should be understood that because optical channel adding or dropping is caused by grooming, fiber cut, or the like, a distribution of transmission channels of the Raman optical amplifier changes. For example, a quantity of transmission channels increases or decreases. For another example, a quantity of transmission channels does not change, but a distribution of the transmission channels in spectral space changes.

In this embodiment of the present invention, for example, multiple distributions of transmission channels may be set by changing the quantity of transmission channels, so that the second gain of each monitoring channel of the at least one monitoring channel in each distribution of transmission channels and the corresponding second gain parameter information are determined. Therefore, a correspondence between a gain of a monitoring channel of the Raman optical amplifier and gain parameter information is determined.

In this embodiment of the present invention, preferably, the apparatus for determining a gain of a Raman optical amplifier may establish a correspondence between a gain of the monitoring channel of the Raman optical amplifier and gain parameter information according to the first gain and the first gain parameter information in each pump source power combination and according to the second gain and the second gain parameter information in each distribution of transmission channels.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

Therefore, according to the method for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the method in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

The method for determining a gain of a Raman optical amplifier according to the embodiments of the present invention is described in detail above with reference to FIG. 1 to FIG. 7. The following describes in detail an apparatus for determining a gain of a Raman optical amplifier and a Raman optical amplifier according to embodiments of the present invention.

As shown in FIG. 8, an apparatus 300 for determining a gain of a Raman optical amplifier according to an embodiment of the present invention includes:

a receiving component 310 configured to receive information, where the receiving component has at least one input port 311; and a processing component 320 connected to the receiving component 310, where the processing component 320 is configured to:

acquire present gain parameter information of a Raman optical amplifier, where the present gain parameter information includes out-of-band amplified spontaneous emission (ASE) noise power information of the Raman optical amplifier, pump light power information of at least one pump source of the Raman optical amplifier, and power information of an output signal of the Raman optical amplifier; and determine a present gain of a monitoring channel of the Raman optical amplifier according to the acquired present gain parameter information and a correspondence between a gain of the monitoring channel of the Raman optical amplifier and gain parameter information.

Therefore, according to the apparatus for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the apparatus in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

In this embodiment of the present invention, optionally, the out-of-band amplified spontaneous emission (ASE) noise power information includes at least one of a short-wave side out-of-band ASE noise power, a long-wave side out-of-band ASE noise power, or a total out-of-band ASE noise power; and the pump light power information of the at least one pump source includes at least one of a drive voltage of the at least one pump source, a drive current of the at least one pump source, or a power of output pump light of the at least one pump source.

It should be understood that in this embodiment of the present invention, "long-wave side" and "short-wave side" are described relative to a wavelength of a data signal channel of the Raman optical amplifier. For example, "long-wave side" refers to a band of wavelengths longer than the wavelength of the data signal channel of the Raman optical amplifier; "short-wave side" refers to a band of wavelengths shorter than the wavelength of the data signal channel of the Raman optical amplifier. For another example, if a wavelength range of the data signal channel of the Raman optical amplifier is 1530 nm to 1560 nm, a wavelength range of "long-wave side" may be 1560 nm to 1580 nm, and a wavelength range of "short-wave side" may be 1510 nm to 1530 nm, but the present invention is not limited thereto.

It should be understood that in this embodiment of the present invention, in order not to affect normal running of the network, when the present gain parameter information of the Raman optical amplifier is acquired, generally an optical splitting method may be used to acquire a part of signal light for detection or measurement. Therefore, there may be a proportionality coefficient between a result obtained by measuring the part of signal light and a result obtained by measuring all signal light that is not split, where the proportionality coefficient may be, for example, a split ratio of a splitter. For example, the power information of the output signal of the Raman optical amplifier may include powers of all output signals, or may include powers of some output signals obtained by using the splitter.

Optionally, the out-of-band amplified spontaneous emission (ASE) noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

Optionally, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

It should also be understood that in this embodiment of the present invention, the acquired present gain parameter information of the Raman optical amplifier may include gain parameter information obtained by measuring a part of signal light or gain parameter information obtained by measuring all signal light. Correspondingly, in this embodiment of the present invention, the correspondence used for determining the present gain of the monitoring channel of the Raman optical amplifier may include a correspondence between the gain parameter information of the part of signal light and a gain of the monitoring channel of the Raman optical amplifier or a correspondence between the gain parameter information of all the signal light and a gain of the monitoring channel of the Raman optical amplifier, but the present invention is not limited thereto.

Optionally, the processing component 320 is further configured to adjust the gain of the monitoring channel of the Raman optical amplifier to a target gain by controlling a pump light power of the at least one pump source of the Raman optical amplifier.

Optionally, the controlling a pump light power of the at least one pump source of the Raman optical amplifier by the processing component 320 specifically includes:

determining a magnitude relationship between the present gain of the monitoring channel of the Raman optical amplifier and the target gain; and when determining that the present gain of the monitoring channel is greater than the target gain, reducing the pump light power of the at least one pump source; or when determining that the present gain of the monitoring channel is less than the target gain, increasing the pump light power of the at least one pump source.

Optionally, in this embodiment of the present invention, the processing component 320 is further configured to:

before determining the present gain of the monitoring channel of the Raman optical amplifier, establish a correspondence between a gain of at least one monitoring channel including the monitoring channel and gain parameter information.

Optionally, in this embodiment of the present invention, the at least one monitoring channel includes a transmission channel corresponding to an output-power peak value and/or output-power trough value of the Raman optical amplifier.

Figure 9:
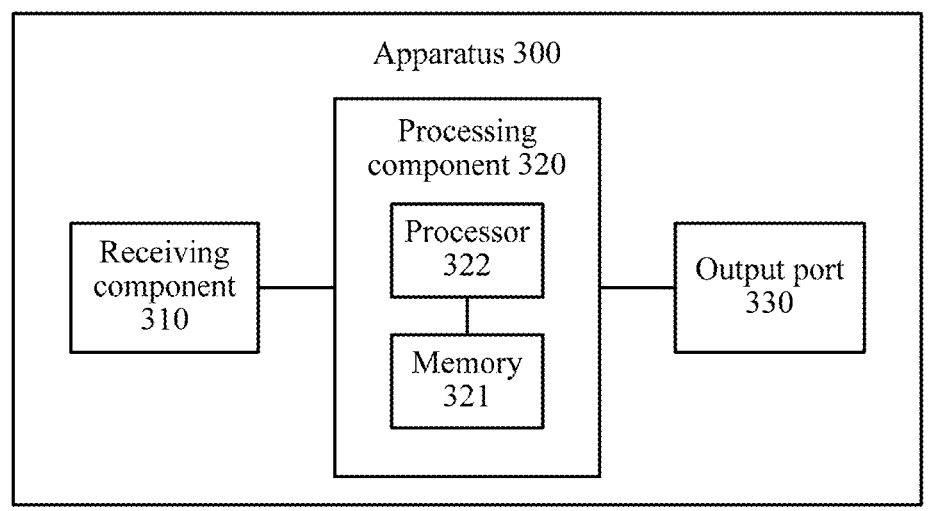
FIG. 9 is another schematic block diagram of an apparatus for determining a gain of a Raman optical amplifier according to an embodiment of the present invention.

Optionally, in this embodiment of the present invention, as shown in FIG. 9, the apparatus 300 further includes:

at least one output port 330, configured to output the drive voltage or the drive current to the at least one pump source of the Raman optical amplifier; and the processing component 320 includes a memory 321 and a processor 322, where the memory 321 is configured to store an instruction and the correspondence, and the processor 322 is configured to execute the instruction stored in the memory.

Optionally, in this embodiment of the present invention, the apparatus 300 is an apparatus for determining a gain of a backward Raman optical amplifier.

It should be understood that in this embodiment of the present invention, the processor 322 may be a central processing unit (CPU), or the processor 322 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 321 may include a read-only memory and a random access memory, and provide an instruction and data to the processor 322. A part of the memory 321 may further include a non-volatile random access memory. For example, the memory 321 may further store information about a device type.

It should be understood that in this embodiment of the present invention, the memory 321 and the processor 322 may be connected by using a bus system. In addition to a data bus, the bus system may further include a power bus, a control bus, a status signal bus, and the like. However, for clear description, this embodiment of the present invention is described by using only a bus system as an example.

In an implementation process, each step of the foregoing method may be completed by using an integrated logic circuit of hardware in the processor 710 or an instruction in a form of software. Steps of the method disclosed with reference to the embodiments of the present invention may be directly executed and completed by a hardware processor, or may be executed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing methods by using hardware of the processor. To avoid repetition, details are not described herein again.

In this embodiment of the present invention, optionally, the establishing, by the processing component 320, a correspondence between a gain of at least one monitoring channel including the monitoring channel and gain parameter information, includes:

determining, in multiple transmission channels of the Raman optical amplifier, at least one monitoring channel that is used to monitor a gain;

for multiple pump source power combinations that the pump source of the Raman optical amplifier has, determining a first gain of each monitoring channel of the at least one monitoring channel in each pump source power combination, and first gain parameter information of the Raman optical amplifier in each pump source power combination; and establishing a correspondence between a gain of the monitoring channel of the Raman optical amplifier and gain parameter information according to the first gain and the first gain parameter information in each pump source power combination.

In this embodiment of the present invention, optionally, the determining, by the processing component 320, at least one monitoring channel that is used to monitor a gain, specifically includes:

determining that a transmission channel corresponding to an output-power peak value and/or output-power trough value of the Raman optical amplifier is a monitoring channel of the at least one monitoring channel.

In this embodiment of the present invention, optionally, the determining, by the processing component 320, at least one monitoring channel that is used to monitor a gain, specifically includes:

determining that a transmission channel corresponding to a specific output power of the Raman optical amplifier is a monitoring channel of the at least one monitoring channel, where a difference between the specific output power and the output-power peak value or the output-power trough value of the Raman optical amplifier is a predetermined power value.

Optionally, in this embodiment of the present invention, the processing component 320 is specifically configured to:

for each pump source power combination of the pump source of the Raman optical amplifier, determine an off output power of an output signal on each monitoring channel of the at least one monitoring channel when the pump source is turned off, and an on output power of an output signal on each monitoring channel when the pump source is turned on; and determine that a difference between the on output power of each monitoring channel and the off output power of each monitoring channel is the first gain of each monitoring channel in each pump source power combination.

Optionally, in this embodiment of the present invention, the processing component 320 is specifically configured to:

for multiple distributions of transmission channels that the Raman optical amplifier has, determine a second gain of each monitoring channel of the at least one monitoring channel in each distribution of transmission channels and second gain parameter information of the Raman optical amplifier in each distribution of transmission channels; and the processing component 320 is specifically configured to establish a correspondence between a gain of the monitoring channel of the Raman optical amplifier and gain parameter information according to the first gain and the first gain parameter information in each pump source power combination and according to the second gain and the second gain parameter information in each distribution of transmission channels.

It should be understood that, the apparatus 300 for determining a gain of a Raman optical amplifier according to this embodiment of the present invention may correspond to an execution body of the method in the embodiment of the present invention, and the foregoing and other operations and/or functions of each module in the apparatus 300 implement a corresponding procedure of each method in FIG. 1 to FIG. 7, which is not further described herein for brevity.

Therefore, according to the apparatus for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the apparatus in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

Figure 10:
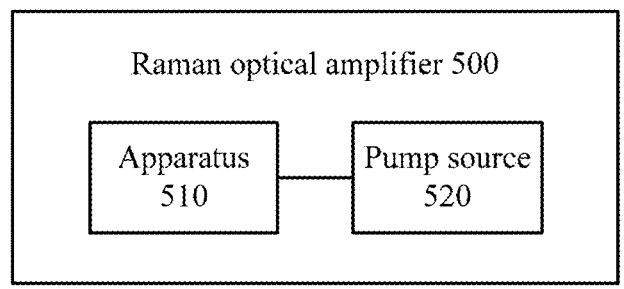
FIG. 10 is a schematic block diagram of a Raman optical amplifier according to an embodiment of the present invention.

As shown in FIG. 10, an embodiment of the present invention further provides a Raman optical amplifier 500, where the Raman optical amplifier 500 includes:

an apparatus 510 for determining a gain of a Raman optical amplifier according to the embodiment of the present invention; and at least one pump source 520 for pumping the Raman optical amplifier 500.

The apparatus 510 includes: a receiving component configured to receive information, where the receiving component has at least one input port; and a processing component connected to the receiving component, where the processing component is configured to: acquire present gain parameter information of the Raman optical amplifier, where the present gain parameter information includes out-of-band amplified spontaneous emission (ASE) noise power information of the Raman optical amplifier, pump light power information of the at least one pump source of the Raman optical amplifier, and power information of an output signal of the Raman optical amplifier; and determine a present gain of a monitoring channel of the Raman optical amplifier according to the acquired present gain parameter information and a correspondence between a gain of the monitoring channel of the Raman optical amplifier and gain parameter information.

Therefore, according to the Raman optical amplifier in this embodiment of the present invention, during running of a communications network, present gain parameter information of the Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the Raman optical amplifier in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

Figure 11:
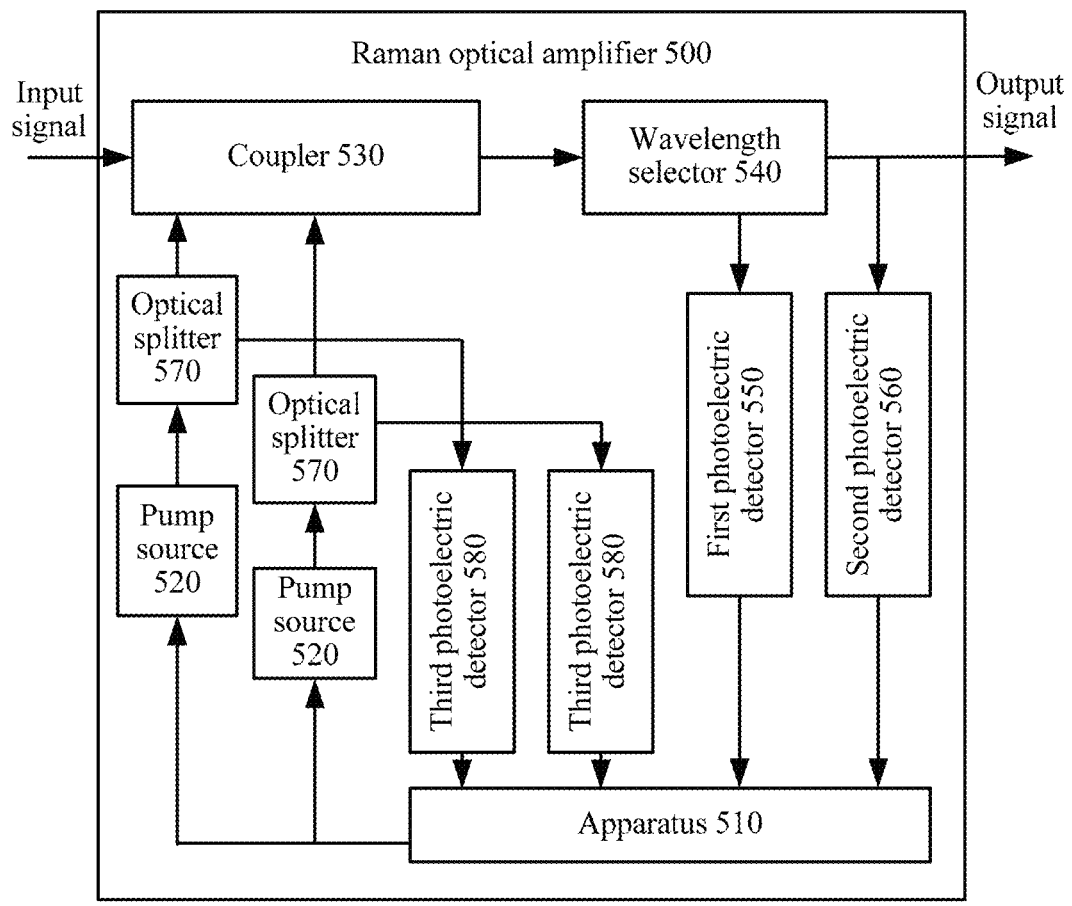
FIG. 11 is another schematic block diagram of a Raman optical amplifier according to an embodiment of the present invention.

In this embodiment of the present invention, as shown in FIG. 11, optionally, the Raman optical amplifier 500 further includes:

a coupler 530, configured to couple output pump light of the at least one pump source to an input fiber of the Raman optical amplifier 500;

a wavelength selector 540, configured to acquire an out-of-band amplified spontaneous emission (ASE) noise of the Raman optical amplifier 500;

a first photoelectric detector 550, configured to convert the out-of-band ASE noise into a first electrical signal, and input the first electrical signal to the processing component of the apparatus 510; and a second photoelectric detector 560, configured to convert an output signal of the Raman optical amplifier 500 into a second electrical signal, and input the second electrical signal to the processing component of the apparatus 510.

In this embodiment of the present invention, as shown in FIG. 11, optionally, the Raman optical amplifier 500 further includes at least one optical splitter 570 and a third photoelectric detector 580, where:

the at least one optical splitter 550 is configured to split the output pump light of the at least one pump source 520 into two parts, where one part of the pump light is input to the input fiber of the Raman optical amplifier 500, and the other part of the pump light is input to the third photoelectric detector 580; and the third photoelectric detector 580 is configured to convert a received optical signal into a third electrical signal, and input the third electrical signal to the processing component of the apparatus 510.

In this embodiment of the present invention, optionally, the out-of-band amplified spontaneous emission (ASE) noise power information includes at least one of a short-wave side out-of-band ASE noise power, a long-wave side out-of-band ASE noise power, or a total out-of-band ASE noise power; and the pump light power information of the at least one pump source includes at least one of a drive voltage of the at least one pump source, a drive current of the at least one pump source, or a power of output pump light of the at least one pump source.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

In this embodiment of the present invention, optionally, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

In this embodiment of the present invention, optionally, the processing component is further configured to adjust the gain of the monitoring channel of the Raman optical amplifier to a target gain by controlling a pump light power of the at least one pump source of the Raman optical amplifier.

In this embodiment of the present invention, optionally, the controlling a pump light power of the at least one pump source of the Raman optical amplifier by the processing component specifically includes:

determining a magnitude relationship between the present gain of the monitoring channel of the Raman optical amplifier and the target gain; and when determining that the present gain of the monitoring channel is greater than the target gain, reducing the pump light power of the at least one pump source; or when determining that the present gain of the monitoring channel is less than the target gain, increasing the pump light power of the at least one pump source.

In this embodiment of the present invention, optionally, the processing component is further configured to:

before determining the present gain of the monitoring channel of the Raman optical amplifier, establish a correspondence between a gain of at least one monitoring channel including the monitoring channel and gain parameter information.

In this embodiment of the present invention, optionally, the at least one monitoring channel includes a transmission channel corresponding to an output-power peak value and/or output-power trough value of the Raman optical amplifier.

In this embodiment of the present invention, optionally, the Raman optical amplifier 500 is a backward Raman optical amplifier.

Optionally, in an embodiment, the establishing, by the processing component, a correspondence between a gain of the monitoring channel of the Raman optical amplifier and gain parameter information, includes:

determining, in multiple transmission channels of the Raman optical amplifier, at least one monitoring channel that is used to monitor a gain;

for multiple pump source power combinations that the pump source of the Raman optical amplifier has, determining a first gain of each monitoring channel of the at least one monitoring channel in each pump source power combination, and first gain parameter information of the Raman optical amplifier in each pump source power combination; and establishing a correspondence between a gain of the monitoring channel of the Raman optical amplifier and gain parameter information according to the first gain and the first gain parameter information in each pump source power combination.

Optionally, in an embodiment, the determining, by the processing component, a first gain of each monitoring channel of the at least one monitoring channel in each pump source power combination, includes:

for each pump source power combination of the pump source of the Raman optical amplifier, determining an off output power of an output signal on each monitoring channel of the at least one monitoring channel when the pump source is turned off, and an on output power of an output signal on each monitoring channel when the pump source is turned on; and determining that a difference between the on output power of each monitoring channel and the off output power of each monitoring channel is the first gain of each monitoring channel in each pump source power combination.

Optionally, in an embodiment, the establishing, by the processing component, a correspondence between a gain of the monitoring channel of the Raman optical amplifier and gain parameter information according to the first gain and the first gain parameter information in each pump source power combination, includes:

for multiple distributions of transmission channels that the Raman optical amplifier has, determining a second gain of each monitoring channel of the at least one monitoring channel in each distribution of transmission channels and second gain parameter information of the Raman optical amplifier in each distribution of transmission channels; and establishing a correspondence between a gain of the monitoring channel of the Raman optical amplifier and gain parameter information according to the first gain and the first gain parameter information in each pump source power combination and according to the second gain and the second gain parameter information in each distribution of transmission channels.

Optionally, in an embodiment, the determining, by the processing component, at least one monitoring channel that is used to monitor a gain, includes:

determining that a transmission channel corresponding to an output-power peak value and/or output-power trough value of the Raman optical amplifier is a monitoring channel of the at least one monitoring channel.

Optionally, in an embodiment, the determining, by the processing component, at least one monitoring channel that is used to monitor a gain, includes:

determining that a transmission channel corresponding to a specific output power of the Raman optical amplifier is a monitoring channel of the at least one monitoring channel, where a difference between the specific output power and the output-power peak value or the output-power trough value of the Raman optical amplifier is a predetermined power value.

It should be understood that, the apparatus 510 included in the Raman optical amplifier according to this embodiment of the present invention may correspond to an execution body of the method of the embodiment of the present invention, and correspond to the apparatus 300 for determining a gain of a Raman optical amplifier according to this embodiment of the present invention, and the foregoing and other operations and/or functions of each module in the apparatus 510 implement a corresponding procedure of each method in FIG. 1 to FIG. 7, which is not further described herein for brevity.

Therefore, according to the Raman optical amplifier in this embodiment of the present invention, during running of a communications network, present gain parameter information of the Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the Raman optical amplifier in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

It should be understood that in the embodiments of the present invention, "B corresponding to A" indicates that B is associated with A and that B may be determined according to A. However, it should also be understood that determining B according to A does not mean determining B according to only A; instead, B may be further determined according to A and/or other information.

In addition, the terms "system" and "network" may be used interchangeably in this specification. The term "and/or" in this specification indicates only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 12:
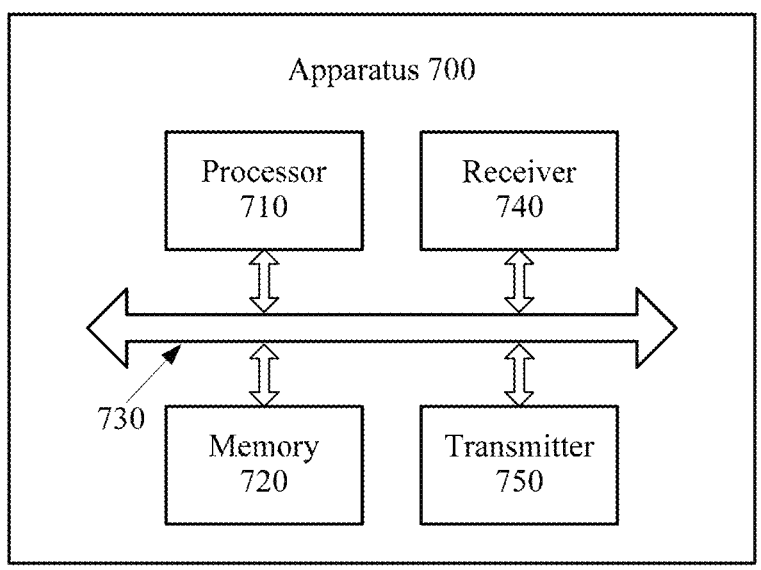
FIG. 12 is still another schematic block diagram of an apparatus for determining a gain of a Raman optical amplifier according to an embodiment of the present invention.

As shown in FIG. 12, an embodiment of the present invention further provides an apparatus 700 for determining a gain of a Raman optical amplifier, where the apparatus 700 includes a processor 710, a memory 720, and a bus system 730. The processor 710 and the memory 720 are connected by using the bus system 730; the memory 720 is configured to store an instruction; and the processor 710 is configured to execute the instruction stored in the memory 720. The processor 710 is configured to:

acquire present gain parameter information of a Raman optical amplifier, where the present gain parameter information includes out-of-band amplified spontaneous emission (ASE) noise power information of the Raman optical amplifier, pump light power information of at least one pump source of the Raman optical amplifier, and power information of an output signal of the Raman optical amplifier; and determine a present gain of a monitoring channel of the Raman optical amplifier according to the present gain parameter information and a correspondence between a gain of the monitoring channel of the Raman optical amplifier and gain parameter information.

Therefore, according to the apparatus for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the apparatus in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

It should be understood that in this embodiment of the present invention, the processor 710 may be a central processing unit (CPU), or the processor 710 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 720 may include a read-only memory and a random access memory, and provide an instruction and data to the processor 710. A part of the memory 720 may further include a non-volatile random access memory. For example, the memory 720 may further store information about a device type.

The bus system 730 may further include a power bus, a control bus, a status signal bus, and the like, in addition to a data bus. However, for clear description, various buses in the figure are marked as the bus system 730.

In an implementation process, each step of the foregoing methods may be completed by using an integrated logic circuit of hardware in the processor 710 or an instruction in a form of software. Steps of the methods disclosed with reference to the embodiments of the present invention may be directly executed and completed by a hardware processor, or may be executed and completed by using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing methods by using hardware of the processor. To avoid repetition, details are not described herein again.

Optionally, in an embodiment, the out-of-band amplified spontaneous emission (ASE) noise power information includes at least one of a short-wave side out-of-band ASE noise power, a long-wave side out-of-band ASE noise power, or a total out-of-band ASE noise power; and the pump light power information of the at least one pump source includes at least one of a drive voltage of the at least one pump source, a drive current of the at least one pump source, or a power of output pump light of the at least one pump source.

Optionally, in an embodiment, the out-of-band amplified spontaneous emission (ASE) noise power information includes a short-wave side out-of-band ASE noise power and a long-wave side out-of-band ASE noise power; the pump light power information of the at least one pump source includes a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

Optionally, in an embodiment, the out-of-band amplified spontaneous emission (ASE) noise power information includes a short-wave side out-of-band ASE noise power and a long-wave side out-of-band ASE noise power; the pump light power information of the at least one pump source includes a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

Optionally, in an embodiment, the out-of-band amplified spontaneous emission (ASE) noise power information includes a short-wave side out-of-band ASE noise power and a long-wave side out-of-band ASE noise power; the pump light power information of the at least one pump source includes a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

Optionally, in an embodiment, the processor 710 is further configured to adjust the gain of the monitoring channel of the Raman optical amplifier to a target gain by controlling a pump light power of the at least one pump source of the Raman optical amplifier.

Optionally, in an embodiment, the controlling a pump light power of the at least one pump source of the Raman optical amplifier by the processor 710 includes:

determining a magnitude relationship between the present gain of the monitoring channel of the Raman optical amplifier and the target gain; and when the present gain of the monitoring channel is greater than the target gain, reducing the pump light power of the at least one pump source; or when the present gain of the monitoring channel is less than the target gain, increasing the pump light power of the at least one pump source.

Optionally, in an embodiment, the processor 710 is further configured to: before determining the present gain of the monitoring channel of the Raman optical amplifier, establish a correspondence between a gain of at least one monitoring channel including the monitoring channel and gain parameter information.

Optionally, in an embodiment, the apparatus 700 further includes a receiver 740 and a transmitter 750, where the receiver 740 is configured to receive the present gain parameter information of the Raman optical amplifier, and the transmitter 750 is configured to send the drive voltage or the drive current to the pump source, to change the power of the pump light output by the pump source.

Optionally, in an embodiment, the establishing, by the processor 710, a correspondence between a gain of the monitoring channel of the Raman optical amplifier and gain parameter information, includes:

determining, in multiple transmission channels of the Raman optical amplifier, at least one monitoring channel that is used to monitor a gain;

for multiple pump source power combinations that the pump source of the Raman optical amplifier has, determining a first gain of each monitoring channel of the at least one monitoring channel in each pump source power combination, and first gain parameter information of the Raman optical amplifier in each pump source power combination; and establishing a correspondence between a gain of the monitoring channel of the Raman optical amplifier and gain parameter information according to the first gain and the first gain parameter information in each pump source power combination.

Optionally, in an embodiment, the determining, by the processor 710, a first gain of each monitoring channel of the at least one monitoring channel in each pump source power combination, includes:

for each pump source power combination of the pump source of the Raman optical amplifier, determining an off output power of an output signal on each monitoring channel of the at least one monitoring channel when the pump source is turned off, and an on output power of an output signal on each monitoring channel when the pump source is turned on; and determining that a difference between the on output power of each monitoring channel and the off output power of each monitoring channel is the first gain of each monitoring channel in each pump source power combination.

Optionally, in an embodiment, the establishing, by the processor 710, a correspondence between a gain of the monitoring channel of the Raman optical amplifier and gain parameter information according to the first gain and the first gain parameter information in each pump source power combination, includes:

for multiple distributions of transmission channels that the Raman optical amplifier has, determining a second gain of each monitoring channel of the at least one monitoring channel in each distribution of transmission channels and second gain parameter information of the Raman optical amplifier in each distribution of transmission channels; and establishing a correspondence between a gain of the monitoring channel of the Raman optical amplifier and gain parameter information according to the first gain and the first gain parameter information in each pump source power combination and according to the second gain and the second gain parameter information in each distribution of transmission channels.

Optionally, in an embodiment, the determining, by the processor 710, at least one monitoring channel that is used to monitor a gain, includes:

determining that a transmission channel corresponding to an output-power peak value and/or output-power trough value of the Raman optical amplifier is a monitoring channel of the at least one monitoring channel.

Optionally, in an embodiment, the determining, by the processor 710, at least one monitoring channel that is used to monitor a gain, includes:

determining that a transmission channel corresponding to a specific output power of the Raman optical amplifier is a monitoring channel of the at least one monitoring channel, where a difference between the specific output power and the output-power peak value or the output-power trough value of the Raman optical amplifier is a predetermined power value.

It should be understood that, the apparatus 700 for determining a gain of a Raman optical amplifier according to this embodiment of the present invention may correspond to an execution body of the method of this embodiment of the present invention and may correspond to the apparatus 300 and the apparatus 510 according to the embodiments of the present invention, and the foregoing and other operations and/or functions of each module in the apparatus 700 implement a corresponding procedure of each method in FIG. 1 to FIG. 7, which is not further described herein for brevity.

Therefore, according to the apparatus for determining a gain of a Raman optical amplifier in this embodiment of the present invention, during running of a communications network, present gain parameter information of a Raman optical amplifier is acquired in real time, and a present gain of a monitoring channel is determined according to the present gain parameter information and a correspondence between a gain of the monitoring channel of the Raman optical amplifier and gain parameter information. Because the present gain parameter information includes out-of-band ASE noise power information of the Raman optical amplifier, pump light power information of at least one pump source, and power information of an output signal, according to the apparatus in this embodiment of the present invention, the present gain of the monitoring channel can be accurately determined; therefore, a gain spectrum of the Raman optical amplifier can be accurately monitored, and the gain of the Raman optical amplifier can be accurately adjusted to a target gain. In this way, a communications network fault caused by a change in the gain of the Raman optical amplifier can be avoided, performance of the Raman optical amplifier can be improved, and transmission performance of the communications network is further improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product may be stored in a storage medium and includes several instructions for instructing a computer device (which may be a personal computer, a server, or a network device) to perform all or a part of the steps of the methods described in the embodiments of the present invention. The foregoing storage medium may include: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a gain of a Raman optical amplifier, wherein the method comprises:
    establishing a correspondence between a gain of at least one monitoring channel of the Raman optical amplifier and gain parameter information; wherein the at least one monitoring channel comprises at least one of a transmission channel corresponding to an output-power peak value and an output-power trough value of the Raman optical amplifier;
    acquiring present gain parameter information of a Raman optical amplifier, wherein the present gain parameter information comprises out-of-band amplified spontaneous emission (ASE) noise power information of ASE noise generated by the Raman optical amplifier, pump light power information of at least one pump source of the Raman optical amplifier, and power information of an output signal of the Raman optical amplifier; and
    determining a present gain of a monitoring channel of the Raman optical amplifier according to the present gain parameter information and the correspondence between the gain of the at least one monitoring channel of the Raman optical amplifier and the gain parameter information; wherein the monitoring channel of the Raman optical amplifier is comprised in the at least one monitoring channel, and the present gain parameter information is included in the gain parameter information.

2. The method according to claim 1, wherein the out-of-band amplified spontaneous emission (ASE) noise power information comprises at least one of a short-wave side out-of-band ASE noise power, a long-wave side out-of-band ASE noise power, and a total out-of-band ASE noise power; and
    the pump light power information of the at least one pump source comprises at least one of a drive voltage of the at least one pump source, a drive current of the at least one pump source, and a power of output pump light of the at least one pump source.

3. The method according to claim 1, wherein the out-of-band amplified spontaneous emission (ASE) noise power information comprises a short-wave side out-of-band ASE noise power and a long-wave side out-of-band ASE noise power; the pump light power information of the at least one pump source comprises a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

4. The method according to claim 1, wherein the out-of-band amplified spontaneous emission (ASE) noise power information comprises a short-wave side out-of-band ASE noise power and a long-wave side out-of-band ASE noise power; the pump light power information of the at least one pump source comprises a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

5. The method according to claim 1, wherein the out-of-band amplified spontaneous emission (ASE) noise power information comprises a short-wave side out-of-band ASE noise power and a long-wave side out-of-band ASE noise power; the pump light power information of the at least one pump source comprises a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

6. The method according to claim 1, wherein the method further comprises:
    adjusting the gain of the monitoring channel of the Raman optical amplifier to a target gain by controlling a pump light power of the at least one pump source of the Raman optical amplifier.

7. The method according to claim 6, wherein the controlling a pump light power of the at least one pump source of the Raman optical amplifier comprises:
    determining a magnitude relationship between the present gain of the monitoring channel of the Raman optical amplifier and the target gain; and
    when the present gain of the monitoring channel is greater than the target gain, reducing the pump light power of the at least one pump source; and
    when the present gain of the monitoring channel is less than the target gain, increasing the pump light power of the at least one pump source.

8. An apparatus for determining a gain of a Raman optical amplifier, wherein the apparatus comprises a processor and a non-transitory computer-readable memory including computer-executable instructions executed by the processor to perform operations comprising:

receiving information, through at least one input port;

establishing a correspondence between a gain of at least one monitoring channel of the Raman optical amplifier and gain parameter information; wherein the at least one monitoring channel comprises at least one of a transmission channel corresponding to an output-power peak value and an output-power trough value of the Raman optical amplifier;

acquiring present gain parameter information of a Raman optical amplifier, wherein the present gain parameter information comprises out-of-band amplified spontaneous emission (ASE) noise power information of ASE noise generated by the Raman optical amplifier, pump light power information of at least one pump source of the Raman optical amplifier, and power information of an output signal of the Raman optical amplifier; and determining a present gain of a monitoring channel of the Raman optical amplifier according to the acquired present gain parameter information and the correspondence between the gain of the at least one monitoring channel of the Raman optical amplifier and the gain parameter information; wherein the monitoring channel of the Raman optical amplifier is comprised in the at least one monitoring channel and the present gain parameter information is included in the gain parameter information.

9. The apparatus according to claim 8, wherein the out-of-band amplified spontaneous emission (ASE) noise power information comprises at least one of a short-wave side out-of-band ASE noise power, a long-wave side out-of-band ASE noise power, and a total out-of-band ASE noise power; and the pump light power information of the at least one pump source comprises at least one of a drive voltage of the at least one pump source, a drive current of the at least one pump source, and a power of output pump light of the at least one pump source.

10. The apparatus according to claim 8, wherein the out-of-band amplified spontaneous emission (ASE) noise power information comprises a short-wave side out-of-band ASE noise power and a long-wave side out-of-band ASE noise power; the pump light power information of the at least one pump source comprises a power of output pump light of the at least one pump source; and in the correspondence, each combination of the short-wave side out-of-band ASE noise power, the long-wave side out-of-band ASE noise power, the power of the output pump light of the at least one pump source, and the power information of the output signal corresponds to one gain of the monitoring channel.

11. The apparatus according to claim 8, wherein the out-of-band amplified spontaneous emission (ASE) noise power information comprises a short-wave side out-of-band ASE noise power and a long-wave side out-of-band ASE noise power; the pump light power information of the at least one pump source comprises a drive voltage of the at least one pump source; and in the correspondence, each combination of the short-wave side out-of-band ASE noise power, the long-wave side out-of-band ASE noise power, the drive voltage of the at least one pump source, and the power information of the output signal corresponds to one gain of the monitoring channel.

12. The apparatus according to claim 8, wherein the out-of-band amplified spontaneous emission (ASE) noise power information comprises a short-wave side out-of-band ASE noise power and a long-wave side out-of-band ASE noise power; the pump light power information of the at least one pump source comprises a drive current of the at least one pump source; and in the correspondence, each combination of the short-wave side out-of-band ASE noise power, the long-wave side out-of-band ASE noise power, the drive current of the at least one pump source, and the power information of the output signal corresponds to one gain of the monitoring channel.

13. The apparatus according to claim 8, wherein the operations further comprise adjusting the gain of the monitoring channel of the Raman optical amplifier to a target gain by controlling a pump light power of the at least one pump source of the Raman optical amplifier.

14. The apparatus according to claim 13, wherein the controlling a pump light power of the at least one pump source of the Raman optical amplifier by the processing component comprises:

determining a magnitude relationship between the present gain of the monitoring channel of the Raman optical amplifier and the target gain; and when the present gain of the monitoring channel is greater than the target gain, reducing the pump light power of the at least one pump source; and when the present gain of the monitoring channel is less than the target gain, increasing the pump light power of the at least one pump source.

15. The apparatus according to claim 8, wherein the operations further comprise outputting, through at least one output port, at least one of the drive voltage or and the drive current to the at least one pump source of the Raman optical amplifier;

the apparatus further comprises a receiver; and the non-transitory computer-readable memory stores the correspondence.

16. The apparatus according to claim 8, wherein the apparatus is an apparatus for determining a gain of a backward Raman optical amplifier.

* * * * *